US012702173B2

(12) United States Patent
Qu et al.

(10) Patent No.: US 12,702,173 B2
(45) **Date of Patent: *Aug. 11, 2026**

(54) STRAP FOR FACE MASK HAVING MULTIPLE CONFIGURATIONS

(71) Applicant: HONEYWELL SAFETY PRODUCTS USA, INC., Charlotte, NC (US)

(72) Inventors: Rocky Qu, Morris Plains, NJ (US); Gio Xu, Morris Plains, NJ (US); Zhaoxia Jin, Morris Plains, NJ (US)

(73) Assignee: Honeywell Safety Products USA, Inc., Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,010

(22) Filed: Apr. 2, 2024

(65) Prior Publication Data

US 2024/0245151 A1 Jul. 25, 2024

Related U.S. Application Data

(63) Continuation of application No. 16/349,061, filed as application No. PCT/CN2016/105437 on Nov. 11, 2016, now Pat. No. 11,969,035.

(51) Int. Cl.
*A41D 13/11* (2006.01)
*A62B 18/08* (2006.01)

(52) U.S. Cl.
CPC ........ *A41D 13/1161* (2013.01); *A62B 18/084* (2013.01)

(58) Field of Classification Search
CPC .. A41D 13/11–1192; A62B 18/00–025; A62B 18/06; A62B 18/08; A62B 18/084; A62B 7/00–14; A62B 9/00; A62B 23/00–06; A61M 16/06–0694; A44B 11/00–28; A44B 13/00–02; A44B 99/00
See application file for complete search history.

(56) References Cited

U.S. PATENT DOCUMENTS 2,312,630 A * 3/1943 Dauster ................ A62B 18/084 128/207.11
3,013,556 A * 12/1961 Galleher, Jr. ........ A62B 18/084 2/206
3,040,741 A 6/1962 Carolan
(Continued)

FOREIGN PATENT DOCUMENTS

CN 104839910 A 8/2015
CN 205214283 U 5/2016
(Continued)

OTHER PUBLICATIONS

Advisory Action (PTOL-303) Mailed on Jan. 17, 2023 for U.S. Appl. No. 16/349,061.
(Continued)

*Primary Examiner* — Michelle J Lee
(74) *Attorney, Agent, or Firm* — Fredrikson & Byron, P.A.

(57) ABSTRACT

Embodiments relate generally to masks, such as filtration masks, with multiple strap configurations. For example, such masks might be worn in either a head strap or an ear strap configuration. Embodiments typically comprise two ear straps each with a connector support element allowing removable attachment of a separate head strap.

10 Claims, 6 Drawing Sheets

(56) References Cited

U.S. PATENT DOCUMENTS

| | | | | |
|---|---|---|---|---|
| 5,724,965 | A | 3/1998 | Handke et al. | |
| 5,906,033 | A | 5/1999 | Mukaiyama | |
| 7,296,575 | B1 * | 11/2007 | Radney | A61M 16/06 128/207.11 |
| 11,969,035 | B2 * | 4/2024 | Qu | A62B 18/084 |
| 2002/0117177 | A1 | 8/2002 | Kwok | |
| 2005/0103344 | A1 | 5/2005 | Cheng | |
| 2005/0155604 | A1 * | 7/2005 | Ging | A61M 16/0616 128/207.11 |
| 2007/0055191 | A1 | 3/2007 | Farrell et al. | |
| 2008/0196727 | A1 * | 8/2008 | Ho | A61M 16/0683 128/207.18 |
| 2009/0000624 | A1 * | 1/2009 | Lee | A62B 18/084 128/207.11 |
| 2015/0128953 | A1 * | 5/2015 | Formica | B32B 3/08 128/206.21 |
| 2017/0128754 | A1 * | 5/2017 | Hou | A62B 18/02 |

FOREIGN PATENT DOCUMENTS

| | | |
|---|---|---|
| GB | 2507296 A | 4/2014 |
| JP | 3199562 U | 9/2015 |

OTHER PUBLICATIONS

Advisory Action (PTOL-303) Mailed on May 18, 2022 for U.S. Appl. No. 16/349,061.

Advisory Action (PTOL-303) Mailed on Nov. 15, 2023 for U.S. Appl. No. 16/349,061, 3 page(s).

Examiner Interview Summary Record (PTOL-413) Mailed on Jan. 10, 2024 for U.S. Appl. No. 16/349,061, 1 page(s).

Final Rejection Mailed on Mar. 4, 2022 for U.S. Appl. No. 16/349,061, 13 page(s).

Final Rejection Mailed on Oct. 25, 2022 for U.S. Appl. No. 16/349,061, 14 page(s).

Final Rejection Mailed on Sep. 6, 2023 for U.S. Appl. No. 16/349,061, 16 page(s).

IPEA/409—International Preliminary Report on Patentability Mailed on May 23, 2019 for WO Application No. PCT/CN16/105437, 6 page(s).

Non-Final Rejection Mailed on Feb. 16, 2023 for U.S. Appl. No. 16/349,061.

Non-Final Rejection Mailed on Jul. 7, 2022 for U.S. Appl. No. 16/349,061, 13 page(s).

Non-Final Rejection Mailed on May 10, 2021 for U.S. Appl. No. 16/349,061, 13 page(s).

Notice of Allowance and Fees Due (PTOL-85) Mailed on Jan. 10, 2024 for U.S. Appl. No. 16/349,061, 12 page(s).

Outgoing—ISA/210—International Search Report Mailed on Jul. 28, 2017 for WO Application No. PCT/CN16/105437, 8 page(s).

* cited by examiner

STRAP FOR FACE MASK HAVING MULTIPLE CONFIGURATIONS

CROSS-REFERENCE TO RELATED APPLICATIONS

This application is a continuation of U.S. patent application Ser. No. 16/349,061, filed May 10, 2019, which claims benefit to Chinese PCT Application No. PCT/CN2016/105437, filed Nov. 11, 2016, each of which is incorporated herein by reference in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD

Embodiments generally relate to multi-strap configuration masks in which the straps may be oriented for a plurality of attachment configurations, for example for use with a user's head and/or ears.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
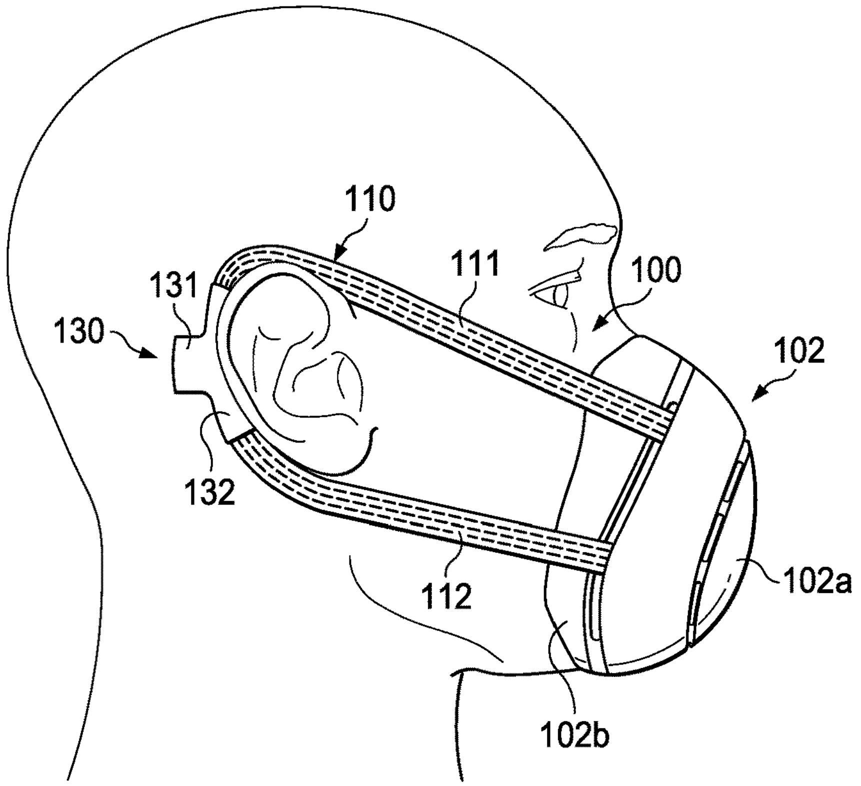
FIG. 1A illustrates a side view of an exemplary embodiment of a face mask configured for use with a user's ears comprising an ear strap with a connector support element allowing removable attachment of a head strap.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, +/−10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The embodiments of this disclosure typically relate to masks having multi-strap configurations for attachment to a user's head and/or ears, and might, for example, typically relate to powered dust masks (although the strap configurations could be used with any type of filtration mask). Conventionally, masks are configured for only a single method of attachment to a user's head or to a user's ears via straps. For example, some masks might attach to a user's ears using ear straps, while other masks might use head straps. Due to varying user comfort levels, the traditional ear strap configuration might lead to tension on some user's ears making it difficult for long-term wear. For example, some users might have a softer auricle making it difficult to snugly hold the face mask in place via the traditional ear straps. On the other hand, for some users the traditional head strap configuration might lead to fit issues where the mask may not adhere snugly to the user's face and might slip off during use, or some users might find conventional head straps non-intuitive for proper use/positioning and/or difficult to keep the head strap in the proper location. Thus, disclosed embodiments may allow a single mask to be configured based on user preference. Additionally, users might prefer to interchange between the ear strap configuration and the head strap configuration (for example, over time), and disclosed embodiments may allow such interchange. And since the head strap of some disclosed embodiments may operate with the ear straps, the head strap may be easier to properly position and may stay in place better. Thus, embodiments of the present invention may address one or more of such issues in an attempt to increase user comfort and provide more flexibility in the manner in which the face mask may be worn.

Disclosed embodiments relate to a strap system for a mask (for example, a half-mask which covers the user's mouth and nose, which may be a powered dust mask in some embodiments), which might, for example, be interchangeably used in an ear configuration or a head configuration. Typically, disclosed embodiments would include an ear strap attached on each corresponding side of the mask. For example, in some embodiments, each ear strap might comprise one elastic element wherein one free end of the ear strap might be attached to the corresponding top half of the mask and the other free end of the ear strap might be attached to the corresponding bottom half of the mask (e.g. both points of attachment on the same side of the mask). In other embodiments, the ear straps might be removably attached to the mask (for example, a smart mask and/or a powered mask) to allow for replacement due to long-term wear. Additionally, each ear strap might comprise a connector support element. The connector support element for each ear strap would typically be located on and/or attached to the corresponding ear strap, and may be configured to allow for removable attachment of a head strap to the mask. In use, the connector support element would typically be positioned in the ear strap in the central position of the ear strap loop, so as to typically be positioned behind the user's ear. Typically, the connector support element would comprise an ear base portion (comprising two free ends) and a removable connector (extending outward away from the ear base portion, e.g. toward the back of the user's head (for example, approximately perpendicular to the ear base portion)) to allow for removable attachment of a head strap. Thus, in some embodiments, the ear base portion of the connector support element may comprise a hollow opening to allow the ear strap on each corresponding side to run through the center/opening of the hollow cavity. In this case, the ear strap may comprise one elastic element. However, in other embodiments, each ear strap may comprise two elastic elements each of which are attached (for example, permanently) to the ear base portion at one free end and to the mask at the other free end. For example, on the right side of the mask, one free end of a first ear strap portion (e.g. elastic element) might be (removably or permanently) attached to the upper right side of the face mask, and the other free end of that ear strap portion might be (removably or permanently) attached to the upper free end of the ear base portion of the connector support element; while for the second ear strap portion, one free end of that ear strap portion might be (removably or permanently) attached to the bottom right side of the face mask, and the other free end of that (second) ear strap portion might be (removably or permanently) attached to the bottom free end of the ear base portion of the connector support element (thereby creating a loop formed by the attachment of the first ear strap portion to the mask and to the ear base portion and the attachment of the second ear strap portion to the other end of the ear base portion and to the mask (on the same side of the mask)). Typically, the same configuration would take place for the left side of the mask. Additionally, in some embodiments, the ear straps may be permanently/securely attached to the face mask (for example, via ultrasonic welding). It is important to note that in this disclosure, "permanently" means that it may be possible to cut or laboriously tear the ear strap elements from the face mask, but this method of removal may effectively destroy or ruin the ear straps and/or the face mask. In this case, "permanently" means that it would be very inconvenient to remove the ear strap elements from the face mask (e.g. not easily and repeatedly done). Persons of skill should appreciate the varying methods by which an ear strap may be attached to a face mask. In this manner, disclosed mask embodiments would typically comprise: two ear straps (one ear strap located on each side of the mask) and a connector support element for each ear strap. Such mask embodiments could then be configured to interact with a removably attachable head strap. So, the mask system embodiments might include a mask configured as described in one of the embodiments above, along with a head strap (e.g. with the head strap removably attached at both its free ends to the ear straps). In other embodiments, a head strap could be permanently attached to the ear straps.

Typically, the top part (e.g. free end) of the left ear strap and the top part (e.g. free end) of the right ear strap would be attached equidistant from the top of the mask and be located on the upper half of the mask (so they might directly oppose each other across the vertical centerline of the mask). Similarly, the bottom part (e.g. free end) of the left ear strap and the bottom part (e.g. free end) of the right ear strap would be attached equidistant from the bottom of the mask and be located on the bottom half of the mask (so they might directly oppose each other across the vertical centerline of the mask). Thus, the ear straps would typically be symmetrical with regards to the mask. Additionally, in some embodiments (e.g. with a single ear strap on each side running through the ear base portion of the connector support element), the length of the top portion (e.g. from the upper mask attachment to the upper free end of the ear base portion) and the bottom portion (e.g. from the lower mask attachment to the bottom free end of the ear base portion) of the ear strap may vary as the user manipulates the location of the connector support element. In other embodiments, the length of the straps may not be manipulated as the connector support element may be securely/permanently attached to the ear straps (such that the position/location of the connector support element would be fixed with regards to its corresponding ear strap). In this case, typically, the top left strap and the top right strap may be similar in length, and the bottom left strap and the bottom right strap may be similar in length. Persons of skill should appreciate the types of materials which would function effectively as straps configured for attachment to a mask (e.g. typically elastic material for the ear straps).

Embodiments of the disclosed mask may typically include features which the Applicant has designed to allow multiple configurations, for example, an ear configuration and a head configuration. For example, the ear strap may comprise a connector support element to allow for removable attachment of a head strap in the head (strap) configuration and to allow for detachment of the head strap in the ear (strap) configuration. Typically, each connector support element may comprise an ear base portion (for example for interaction with the user's ears) and a removable connector (for example for removable attachment and detachment of the head strap). Generally, the connector support element may comprise a harder material (e.g. plastic) and a softer material (e.g. rubber or thermoplastic urethane (TPU)), typically with the softer material located on a portion of the exterior of the harder material. The softer material may generally be located on the ear base portion and configured/positioned to interact with the user's head and/or ears (e.g. located on the inner surface toward the user's head and/or the forward surface towards the user's ear). This would typically increase user comfort (especially for long-term wear) as well as assist in keeping the ear straps in place during use (e.g. due to rubber's ability to serve as a gripping/anti-slip surface). In some embodiments, the softer material may be located to interface with the user's scalp/head. In other embodiments, the softer material may be located to interface with the user's scalp/head and the back of the user's ear. Typically, the connector support element would mainly comprise a harder material (e.g. plastic for example as the underlying base, perhaps with the softer material attached to the surface) to allow the connector support element to remain sturdy and be used long-term. The removable connector part of the connector support element typically also comprises a harder material and extends/projects approximately perpendicularly outwards away from the ear base portion of the connector support element. In other words, the removable connector may extend/project outward away from the user's ear to allow for configurable attachment of the head strap.

Typically, the removable connector is configured to correspond to the method of attachment located at the free ends of the head strap. For example, in some embodiments, the removable connector of the connector support element may comprise an opening of an aperture located at the distal end of the removable connector. In this case, the method of attachment located at the free end of the head strap might be configured to fit (typically in a removable locking manner) within the opening of the aperture. More specifically, in some embodiments, there may be a biased locking element located at the free ends of the head strap. Typically, the biased locking element may be inserted (via the opening) into the aperture of the removable connector. To ensure the biased locking element is locked/configured in place (for example, not easily removable), the biased locking element may comprise a raised projection biased toward a side aperture in the removable connector (e.g. the removable connector may comprise another (side) aperture located on either side of the removable connector (for example, located on the side of the removable connector which the user may easily be able to reach)). To lock the head strap to the removable connector located on the ear strap, the user may insert the biased locking element into the removable connector until the biased raised projection extends out of the aperture on the removable connector. To unlock the head strap, the user may typically depress the raised projection of the biased locking element until there is enough clearance for the user to pull the biased locking element out of the removable connector. In some embodiments, the positions of the biased locking element (projection) and the receiving element aperture may be reversed. In other words, the removable connector may comprise the projecting biased locking element and the free ends of the head strap may comprise an aperture opening located at the distal end(s). In other embodiments, the mechanism of removable attachment may be a magnet (for example, with the magnet located on the free end of the head strap and configured to interface with a receiving element with a ferrous element in the ear strap's removable connector, or the free ends of the head strap having a ferrous element and the ear strap's removable connector comprising a magnet. Persons of skill should appreciate the methods of attachment which would function effectively to allow the user to attach the head strap to the removable connector located on the connector support element.

In use, the face mask would be operable to be manually oriented from a first configuration to a second configuration (for example, from an ear strap configuration to a head strap configuration and/or from a head strap configuration to an ear strap configuration). So, for example, in the ear strap configuration, the top left and bottom left part of the left ear strap would be oriented approximately parallel to each other, and the top right and bottom right part of the right ear strap would be oriented approximately parallel to each other. Additionally, the connector support element may be oriented to lay approximately behind the user's ears. Generally, the removable connector of the connector support element is oriented to extend/project outwards (backwards towards the back of the user's head) away from the user's ears. This may make it easier to configure the mask for the head strap configuration, if desired. In some embodiments (for example, in smart masks and/or powered masks), the user may have the option of detaching the ear straps from the face mask. Typically, this allows the user to replace the elastic ear straps due to aging or damage without having to buy a new smart mask and/or to wash the ear straps. In some embodiments, if replacement is an option, the user may be able to attach the free ends of the ear straps to the corresponding side of the mask using, for example, a plurality of apertures configured to interact with a projection located within the mask. In some embodiments, the free ends of the ear strap may comprise a projection configured to click into a similarly sized aperture on the mask. Persons of skill should appreciate the other forms of removable attachment of an ear strap to a face mask.

In the second configuration, a head strap may be removably attached to the removable connector located on the connector support element on each side of the mask. Typically, in the second configuration, the free ends of the head strap may comprise a biased locking element. Typically, the biased locking element may interact with a removable connector on the ear strap connector support element which comprises an opening/aperture large enough to snugly fit the biased locking element as discussed above. Once the head strap is securely attached to the removable connector, users may have the option of adjusting the length of the head strap in some embodiments. The head strap may comprise a plurality of apertures (typically spanning some length of the head strap) allowing the user to manually configure/adjust the fit and size (e.g. length) of the head strap to snugly fit the face mask onto the user's face. In some embodiments, the plurality of apertures may be configured to interact with a projection on the head strap (thereby allowing the user to pull the head strap until the face mask feels comfortable and is snugly attached to the user's face and inserting the projection (typically located at the ends of the head strap) into a corresponding aperture). In this manner, the method of adjusting the length of the head strap may be similar to using a belt buckle. Alternatively, one or more free ends of the head strap may comprise a slidable, friction buckle. Additionally, in some embodiments, the head strap may comprise two parts. The free right end and free left end of such a 2-part head strap may comprise a buckle to interlink the left and right sides of the mask. The buckle may be configured to allow manual adjustment of the length of the head strap in some embodiments by, for example, sliding the buckle (to tighten or loosen, similar to a conventional belt buckle). Other such methods for interlinking and manually adjusting the length of the strap may also be used. While persons of skill should understand the disclosed embodiments based on the above disclosure, the following figures may provide specific examples that may further clarify the disclosure.

Turning now to the drawings, FIG. 1A illustrates a side view of an exemplary embodiment of a face mask 100 configured for attachment to the user's ears (e.g. ear strap configuration). In FIG. 1A, the face mask 100 is a half-mask 102 configured to cover the user's head/face (e.g. mouth and nose), and further comprises a filter 102*a* and a face seal 102*b*. Additionally, the face mask 100 in the exemplary embodiment shown in FIG. 1A is a dust-mask having a fine particle designation of PM 2.5. However, in other embodiments, the face mask 100 may be a smart mask, a disposable mask, and/or a powered dust-mask. In some embodiments, the face mask 100 may also be a full face mask. The face mask 100 of FIG. 1A comprises an ear strap 110 (with a top portion 111 and a bottom portion 112) with a connector support element 130 and the ear strap 110 attached to a right side of the face mask 100. In some embodiments, the ear strap 110 may be a single continuous strap which forms a loop (with the connector support element 130 attached to the single strap), having a bottom portion 112 located beneath the connector support element 130 and a top portion 111 located above the connector support element. In other embodiments, the ear strap might be formed of two straps, for example a top ear strap portion 111 (with one free end attached to the top of the mask 102 and the other free end attached to the upper end of the connector support element 130) and a bottom ear strap portion 112 (with one free end attached to the bottom of the mask 102 and the other free end attached to the lower end of the connector support element 130). As shown in FIG. 1A, one free end of the ear strap 110 may be attached to the top half of the right side of the face mask 100 while the other free end of the ear strap 110 may be attached to the bottom half of the right side of the face mask 100. Typically, the ear strap 110 may comprise an elastic material to increase user comfort and flexibility. The connector support element 130 is generally configured to lay approximately behind the user's ear as shown in FIG. 1A. The connector support element 130 may comprise two elements: a removable connector 131 (operable/configured to allow removable attachment of a head strap) and an ear base portion 132 (configured to fit behind the user's ear and to better hold the mask in place during ear strap configuration). In FIG. 1A, the removable connector 131 projects/extends perpendicularly outward from the ear base portion 132 (for example, to allow interaction with a head strap), typically extending rearward towards the back of the user's head when the mask is being worn. Generally, the ear base portion 132 is part of the connector support element 130 which is closest to the user's ear, and, in the embodiment in FIG. 1A, it is curved. The curvature of the ear base portion 132 is typically at an angle wide enough to fit the average user's ears. Additionally, the length of the inner part of the ear base portion 132 may be long enough to comfortably interact/sit behind the average user's ears. In other words, the ear base portion 132 may be slightly curved to ensure the pressure required to hold the face mask 100 snugly onto the user's face is distributed across a large area behind the user's ear rather than at one point (or a narrower area). The other (e.g. left) side of the mask 100 would be similar (e.g. typically symmetrical, with a left ear strap having its own connector support element, which is attached to the left side of the filtration mask 102.

Figure 1B:
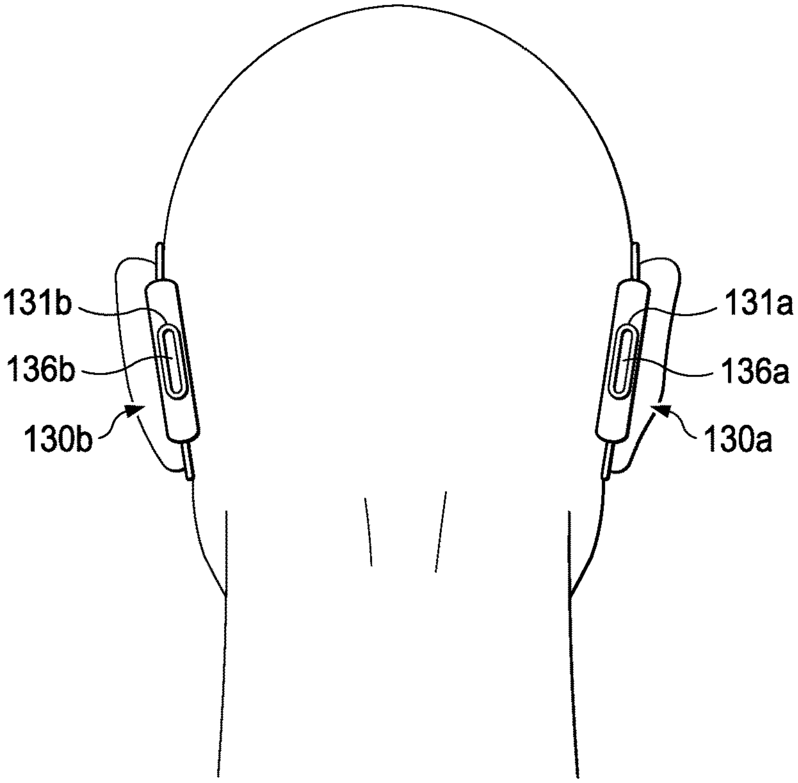
FIG. 1B illustrates a back view of the exemplary embodiment of the face mask shown in FIG. 1A.

FIG. 1B illustrates a back/rear view of the exemplary embodiment of FIG. 1A, showing the connector support elements 130*a*, 130*b* for both ear straps located behind the user's ears. In the embodiment of FIG. 1B, the ear base portion 132 of the connector support element 130*a*, 130*b* is configured to lay approximately directly behind the user's ears. In some embodiments, the user may be able to reconfigure the location of the connector support element 130*a*, 130*b* by moving it up or down along the length of the ear strap 110 on each corresponding side (for example, if the ear strap 110 passes through a hollow opening in the connector support elements 130, providing sliding engagement). However, in other embodiments, the connector support element 130*a*, 130*b* may be securely/permanently attached to the top end and the bottom end of the ear base portion 132 of the connector support element 130*a*, 130*b*. Depending on which embodiment, the user may be able to manually adjust the fit and comfort of the face mask 100 by moving the location of the connector support element 130*a*, 130*b*. As shown in FIG. 1B, each connector support element 130*a*, 130*b* further comprises a removable connector 131*a*, 131*b*. Typically, each removable connector 131*a*, 131*b* may comprise an aperture 136*a*, 136*b* and be centrally located on the ear base portion of the connector support element 130*a*, 130*b* as shown in FIG. 1B. The aperture 136*a*, 136*b* may be configured to interact with a projection (for example from a separate head strap) to allow for secure attachment of the face mask 100 to the user's face in a second (head strap) configuration (for example, allowing the face mask 100 to be used in either an ear strap configuration or a head strap configuration, depending on whether a head strap is removably attached to the ear straps by the removable connectors).

Figure 2A:
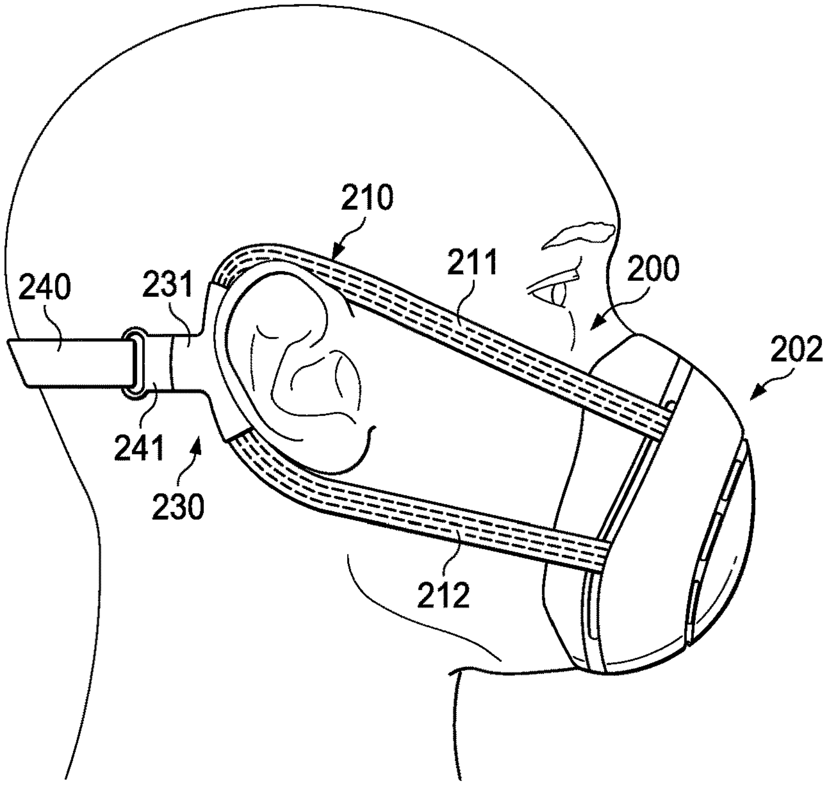
FIG. 2A illustrates a side view of an exemplary embodiment of a face mask configured for use with the user's head, for example with a head strap removably attached via a connector support element to the ear straps.

FIG. 2A illustrates a side view of an exemplary embodiment of a face mask 200 configured for attachment to the user's head (e.g. head strap configuration). In FIG. 2A, the filtration mask 202 is a half-mask similar to the one shown in FIG. 1A, and has ear straps 210 similar to those disclosed above with regards to FIG. 1A, attached thereto. However, in some embodiments, the face mask 200 may be a full face mask, a smart mask, a disposable mask, and/or a powered dust mask. The face mask 200 of FIG. 2A comprises an ear strap 210 (with a top portion 211 and a bottom portion 212, as disclosed above with regards to FIG. 1A) with a connector support element 230. Additionally, in FIG. 2A, a (separate) head strap 240 is (removably) attached to the face mask 200 via the connector support element 230. Similar to FIG. 1A, the ear base portion of the connector support element 230 lays approximately behind the user's ear. Then, the biased locking element 241 of the head strap 240 may interact with the (corresponding) opening in the removable connector 231 of the connector support element 230, allowing for removable locking connection. In the embodiment of FIG. 2A, the head strap 240 comprises a biased locking element 241 located at the free ends of the head strap 240. Also, in the embodiment of FIG. 2A, the biased locking element 241 is attached to the head strap 240 via a loop located on the other end of the biased locking element 241. Thus, in this manner, the head strap 240 may run through the loop on the biased locking element 241 and be securely/permanently attached to ensure the head strap 240 remains fixed to the biased locking element 241 during use. In some embodiments, the length of the head strap may be adjustable, for example using the loop. The biased locking element 241 may be inserted within the opening of the removable connector 231. Typically, the biased locking element 241 may comprise a biased raised projection on at least one side (e.g. corresponding to that of the biased raised projection). Additionally, the removable connector 231 may comprise at least one aperture located on at least one side. In this manner, in the embodiment of FIG. 2A, to lock the head strap 240 to the removable connector 230, the user may insert the biased locking element 241 into the opening of the removable connector 231 until the raised projection extends out of the aperture on the removable connector 231 (for example, the biased locking element 241 clicks into place within the removable connector 231). In the embodiment of FIG. 2A, to unlock the head strap 240 from the removable connector 231, the user may need to depress the raised projection of the biased locking element 241 until the biased locking element 241 has enough clearance to exit the removable connector 231. This form of attachment may be known as a snap joint, and any such snap joint could be used for removable attachment of the head strap to the ear straps. The other (e.g. left) side of the mask 200 would be similar (e.g. typically symmetrical, with a left ear strap having its own connector support element, which is attached to the left side of the filtration mask 202).

Figure 2B:
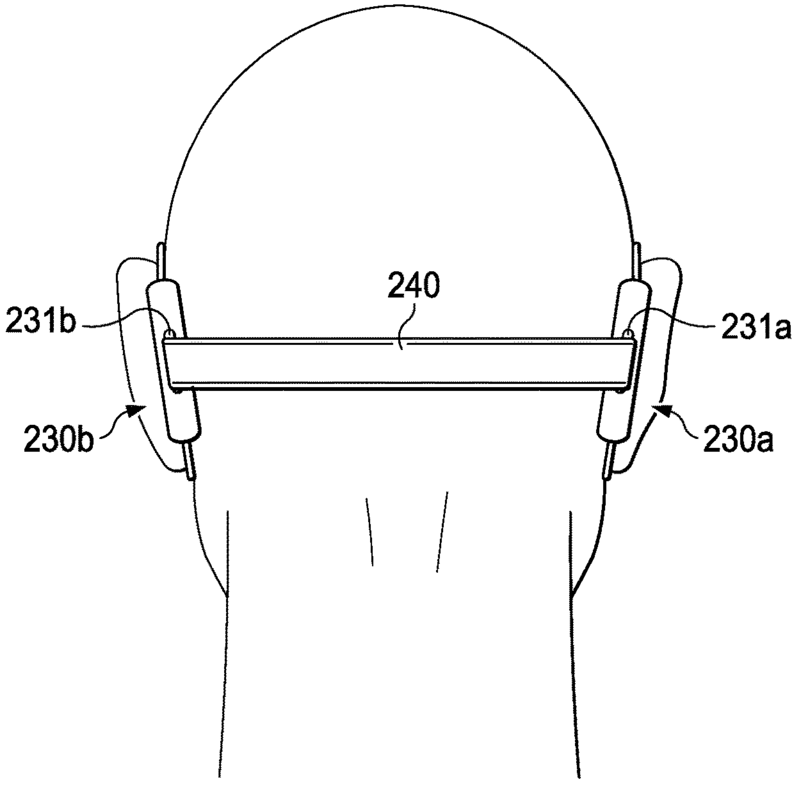
FIG. 2B illustrates a back view of the exemplary embodiment of the face mask shown in FIG. 2A.

FIG. 2B illustrates a back view of a user's head wearing an exemplary embodiment of the face mask 200 of FIG. 2A comprising ear straps each with a connector support element 230*a*, 230*b* and a head strap 240. In the embodiment of FIG. 2B, the (free ends of the) head strap 240 is removably attached to the removable connectors 231*a*, 231*b* of the connector support elements 230*a*, 230*b* for the ear straps. Additionally, the head strap 240 may lie approximately horizontally across the back of the user's head. In some embodiments, the head strap 240 may be adjustable allowing the user to choose the most comfortable length for his/her head. Persons of skill should appreciate the methods of adjusting the length of the head strap 240. In other embodiments, the elastic ear straps may be pulled back away from the user's ears by the head strap 240, with the elasticity of the ear straps providing a customized fit even using a single head strap 240 length. And in some embodiments, the user may be able to adjust the location of the connector support elements 230*a*, 230*b* by moving one or both up or down along the length of the ear strap on each corresponding side.

Figure 3A:
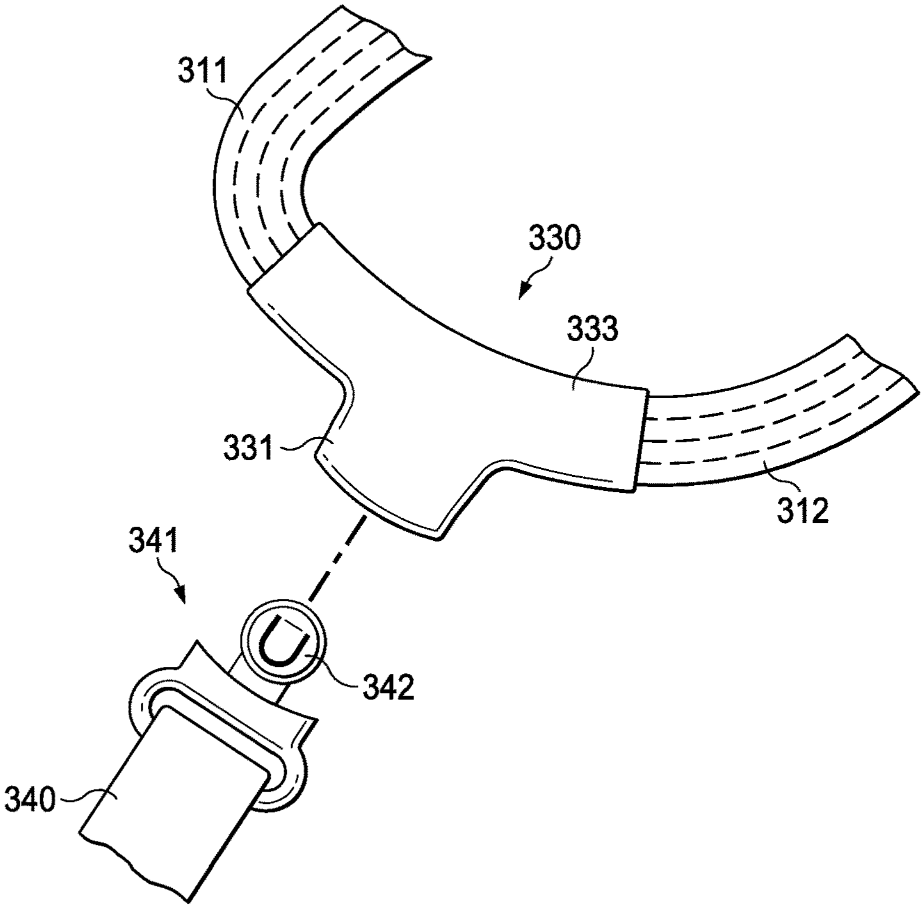
FIG. 3A illustrates a front (e.g. facing outward away from the user's head) side view of an exemplary form of attachment of the ear strap to the head strap via a projection located on a head strap element and an aperture located within the removable connector of the connector support element.

FIG. 3A illustrates an exemplary form of attachment of an ear strap 311, 312 to a head strap 340. In FIG. 3A, the ear strap 311, 312 comprises a connector support element 330. Typically, the connector support element 330 may have two parts: an ear base portion 333 and a removable connector 331. Typically, the removable connector 331 projects approximately perpendicularly outward away from the ear base portion 333 and comprises an aperture (typically located in the distal end). The aperture in FIG. 3A may be configured to interact with a head strap element 341 located on the head strap 340 (for example, allowing insertion of a projection element/biased locking element). In FIG. 3A, the head strap element 341 comprises a biased locking element 342. The biased locking element 342 is configured to insert within the opening/aperture of the removable connector 331. Typically, the biased locking element 342 is configured to be large enough to fit snugly within the opening/aperture of the removable connector 331. Additionally, the biased locking element 342 may further comprise a raised projection as shown in FIG. 3A. The raised projection serves a locking function which is depicted more clearly in the embodiment of FIG. 3B.

Figure 3B:
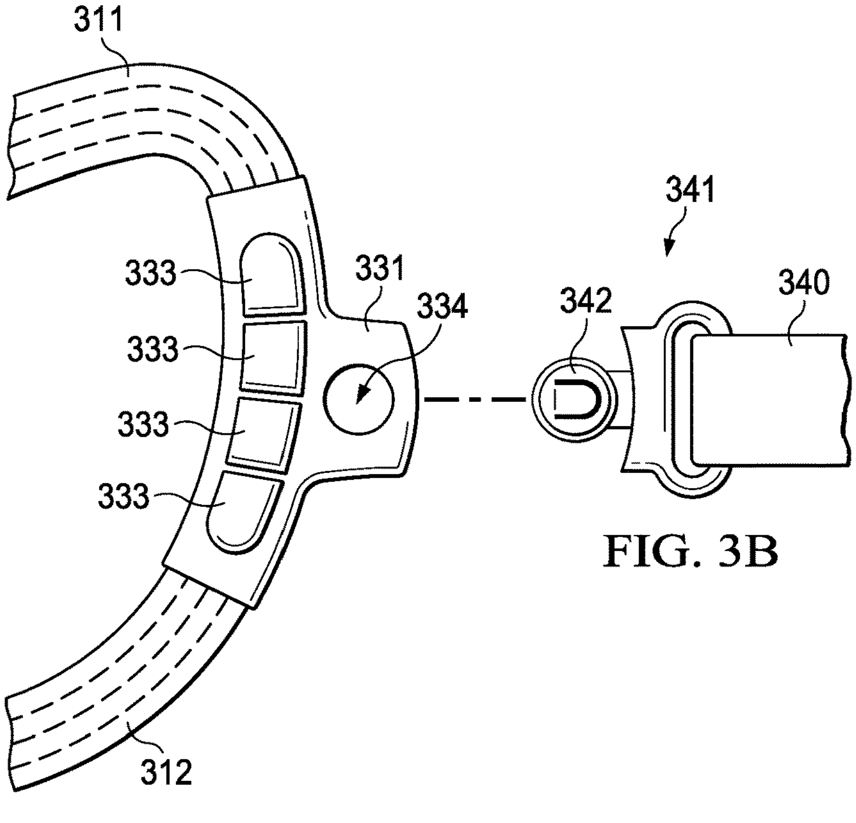
FIG. 3B illustrates a back (e.g. facing inward towards the user's head) side view of an exemplary form of attachment of the ear strap to the head strap via a projection located on the head strap element and an aperture located within the removable connector of the connector support element.

FIG. 3B illustrates another view of the exemplary means of attachment of an ear strap 311, 312 to a head strap 340, similar to the exemplary method shown in FIG. 3A (e.g. the opposite side view). In FIG. 3B, the ear strap 311,312 comprises a connector support element 330. In the embodiment of FIG. 3B, the connector support element 330 comprises an ear base portion 333 (for example for interaction with the user's ears) and a removable connector 331 (for example for removable attachment and detachment of the head strap 340). Additionally, the connector support element 330 comprises a hard material (e.g. plastic) and a soft material (e.g. rubber or TPU). The soft material may generally increase user comfort (especially during long-term wear) as well as assist in keeping the ear straps in place during use (due to rubber's ability to serve a gripping/anti-slip function). In the embodiment shown in FIG. 3B, the soft material spans the backside/underside of the ear base portion of the connector support element. However, in some embodiments, the soft material may also or alternatively span/extend across the inner edge of the ear base portion 333 (for example, the part of the ear base portion which directly interacts with the user's ears). Also shown in FIG. 3B, the removable connector 331 comprises a side or locking aperture 334 for interaction with the biased locking element 342 located at the free end of the head strap 340. In FIG. 3B, the shape of the aperture 334 may be circular. However, the shape may vary as long as the biased locking element 342 is operable to interact with the aperture 334 of the removable connector 331 to provide removable locking fit (via biased interference). In FIG. 3B, the biased locking element 342 comprises a raised projection located on the side which interfaces with the aperture 334 in the removable connector 331. To lock the head strap 340 to the ear strap (311, 312), the user may insert the biased locking element 342 into the opening of the removable connector 331 until the raised projection on the biased locking element 342 juts out of the aperture 334 in the removable connector 331 (in other words, the raised projection of the biased locking element 342 clicks into place within the aperture 334 of the removable connector 331). To unlock the head strap 340 from the ear strap (311, 312), the user may depress the raised projection until the biased locking element 342 has enough clearance to be pulled out of the removable connector 331. This means of locking and unlocking may be known as a snap joint.

Figure 4A:
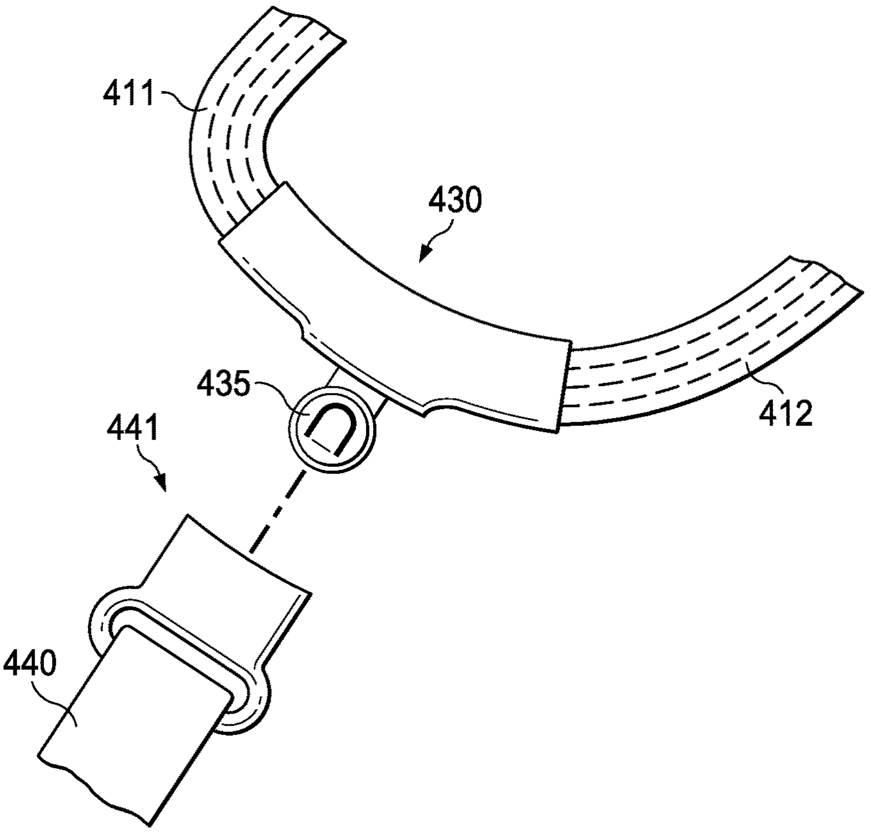
FIG. 4A illustrates a front (e.g. outward facing) perspective view of an alternative exemplary form of attachment of the ear strap to the head strap via a removable connector on the connector support element and an aperture located within the head strap element.

FIG. 4A illustrates an exemplary means of attaching the ear strap 411, 412 to the head strap 440. In the embodiment shown in FIG. 4A, the locking elements between the connector support element 430 and the head strap element are switched in comparison to the embodiment shown in FIG. 3A (e.g. the receiving aperture is located on the head strap, also the projecting locking element is located on the connector support element). In FIG. 4A, the connector support element 430 comprises an ear base portion and a biased locking element 435. The biased locking element 435 may project/extend perpendicularly outward (e.g. rearward, towards the back of the user's head) away from the inner edge of the ear base portion meant to interact with the user's ears. Additionally, in FIG. 4A, the head strap 440 comprises a receiving element 441 (with an aperture opening) located on the free end of the head strap 440. The biased locking element 435 may be inserted within the receiving element 441 (similar to that described with regards to FIG. 3A) to hold the head strap 440 securely in place. The method of locking and unlocking (e.g. snap joint) may be similar to the one described in reference to FIG. 3B.

Figure 4B:
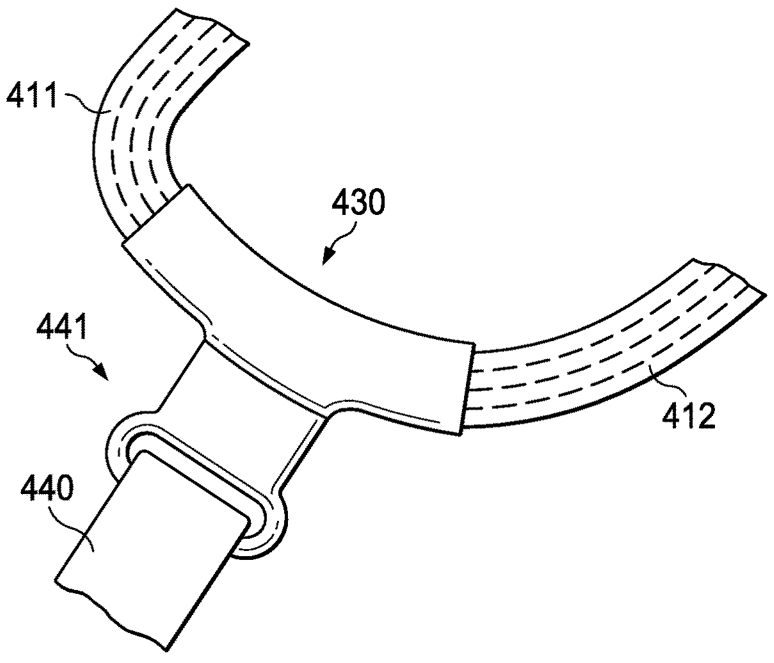
FIG. 4B illustrates a front (e.g. outward facing) perspective view of the exemplary attachment of the ear strap to the head strap of FIG. 4A via the connector support element and the head strap element (e.g. showing the head strap of FIG. 4A removably attached to the ear strap)

FIG. 4B shows the removable attachment mechanism of FIG. 4A when it is locked in place, with attachment of the ear strap 411, 412 to the head strap 440 via the connector support element 430 and the receiving element 441 located on the head strap 440. The connector support element 430 may comprise a biased locking element which may be inserted within the receiving element 441 of the head strap 440 to snugly secure the head strap 440 in place. Although not visible in FIG. 4B, in some embodiments, there may be an aperture located on at least one side of the removable connector 441 to allow the user to detach the biased locking element 435 from the removable connector 441 (similar to that described with regards to FIG. 3B.

Figure 5:
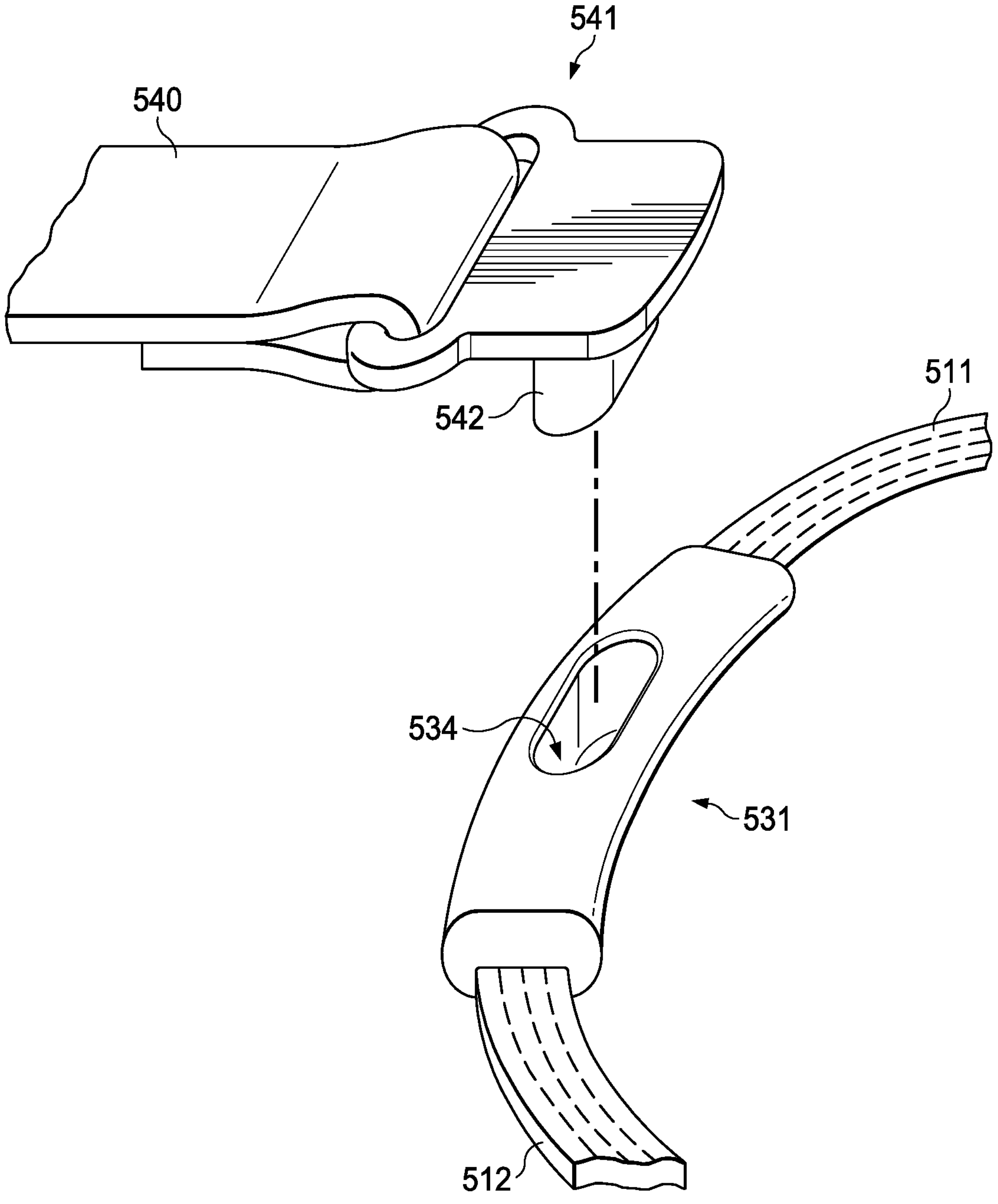
FIG. 5 illustrates a side perspective view of an alternative exemplary form of attachment of the head strap to the ear strap via the head strap element comprising a magnetic projection and the connector support element comprising an aperture.

FIG. 5 illustrates an exemplary means of attaching the head strap 540 to the ear strap 511, 512 using magnetic interlocking. In FIG. 5, the head strap 540 comprises a head strap attachment element 541 located on the free end of the head strap 540. Typically, the head strap attachment element 541 comprises a projection 542 extending perpendicularly outward from base or main body portion of the head strap attachment element 541. In FIG. 5, the projection 542 comprises a magnet. The magnet may be configured to interact with a magnetic-interacting (e.g. ferrous) material located within the connector support element 531. The connector support element 531 of FIG. 5 comprises an aperture 534 in the ear base portion. The aperture 534 may be centrally located and be as deep as the projection 542 located on the head strap attachment element 541. Typically, the magnetic-interacting material would be located at the base of the aperture 534. In some embodiments, the projection 542 on the head strap attachment element 541 may comprise a magnetic-interacting (e.g. ferrous) material while the aperture 534 in the connector support element 531 may comprise a magnet (for example, the position of the magnet and magnetic material may be switched). Persons of skill will understand these and other removable connector means, which might be used to allow for removable connection of the head strap to the ear straps (thereby allowing the mask to be used in either a head strap configuration or an ear strap configuration).

Figure 6:
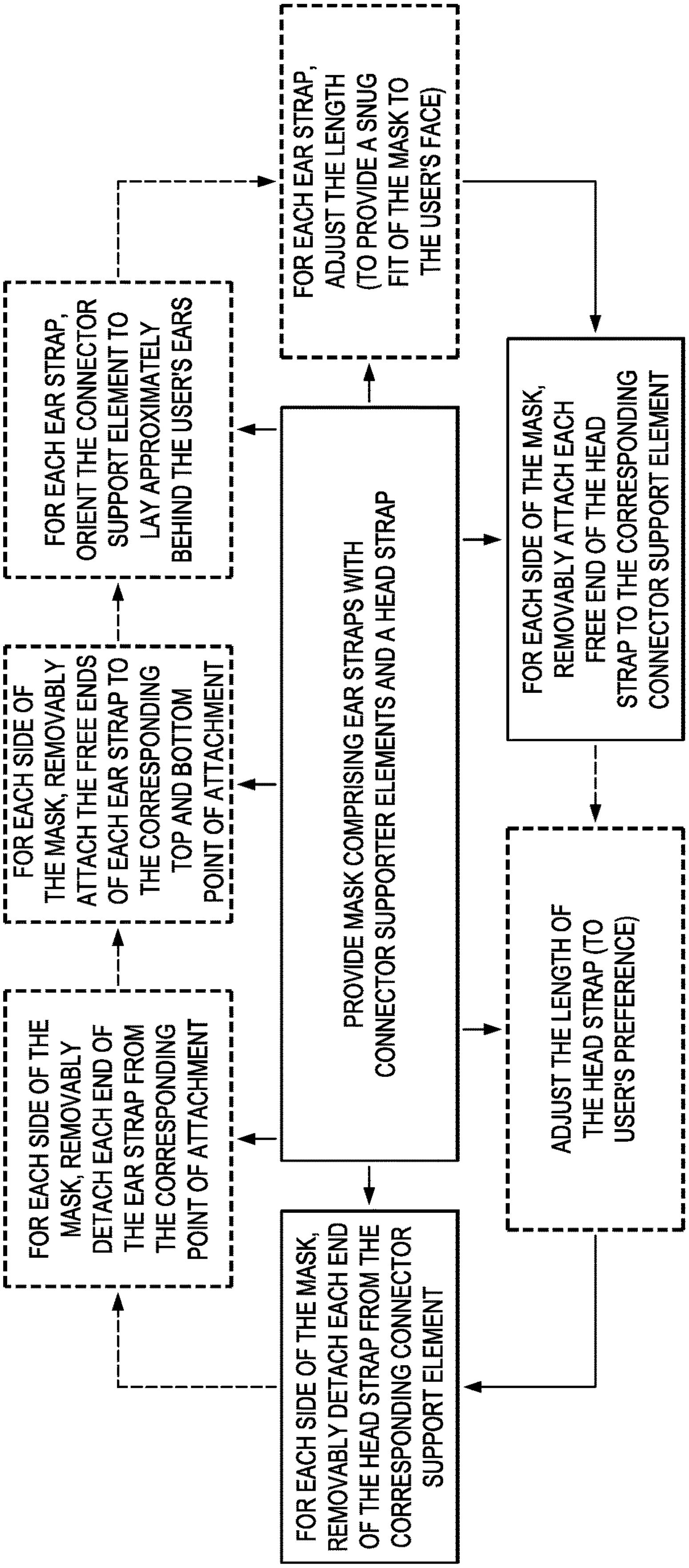
FIG. 6 illustrates, via a flowchart, a method of configuring the mask from an ear strap configuration to a head strap configuration; or vice versa.

FIG. 6 illustrates a flow chart of the method for changing the mask configuration. Typically, the user may be provided with a mask comprising ear straps with a connector support element. Additionally, the user may be provided a (separate) head strap. Depending on the initial configuration of the mask, the user may choose to either place the mask in the ear configuration or the head configuration. For example, if the user chooses to orient the mask in the head configuration, the user may begin with removably attaching each free end of the head strap to the corresponding connector support element for each side of the face mask. Once this is complete, in some embodiments, the user may optionally adjust the length of the head strap to the user's preference. To prepare for the ear configuration, the user may removably detach each end of the head strap from the corresponding connector support element for the ear strap on each side of the mask. In the case of long-term wear of the ear straps (or when the user determines the ear straps need to be replaced or washed), the user may optionally removably detach each end of the ear strap from the corresponding point of attachment on the mask for each side of the mask. Then, the user may removably attach the free ends of the new/replacement/cleaned ear straps to the corresponding top and bottom points of attachment on each side of the mask. In some embodiments, for each ear strap, the user may optionally orient the connector support element to lay approximately behind the user's ear on each side of the mask (for example, sliding the connector support element with regards to its ear strap). Additionally, in some embodiments, the user may optionally adjust the length of the ear straps to provide a snug fit of the mask to the user's face. This may be done by manipulating the location of the connector support element, or, in some embodiments, there may be a series of apertures located near the free ends of the ear straps configured for removable attachment to the point of attachment on the mask. With the series of apertures, the user may optionally choose to use an aperture located closer to the free end of the strap for a looser fit or the user may optionally choose to use an aperture located farther away from the free end of the strap for a tighter/snugger fit. Persons of skill should appreciate the types of methods which would function effectively to adjust the ear strap fit. In this manner, the user may configure the mask between a head strap configuration and an ear strap configuration by following the exemplary method illustrated in FIG. 6.

FIG. 6 illustrates an exemplary method of use, explaining how a user might configure the mask between an ear strap and a head strap configuration (or vice versa). In FIG. 6, the user may not necessarily have one particular beginning/start step and ending/last step. Reconfiguration will depend on the initial configuration of the mask; thus, the flowchart is shown as circular and might be entered at various steps, depending on the initial configuration and desired configuration. Persons of skill should understand this method, especially in light of the method and device disclosure above.

Having described device and method embodiments above, especially with regard to the figures, various additional embodiments can include, but are not limited to:

In a first embodiment, a mask may comprise: a half-mask; two ear straps each with a connector support element; wherein: the half mask is configured to cover a user's nose and mouth; and the connector support elements are configured for removable attachment of a head strap, thereby allowing the mask to be worn in two configurations. A second embodiment can include the mask of the first embodiment, wherein the mask may further comprise a head strap. A third embodiment can include the mask of the first or second embodiments, wherein the head strap may comprise a non-elastic material. A fourth embodiment can include the mask of the first to third embodiments, wherein the mask may comprise two configurations, wherein in the first configuration, the ear strap is configured to interact with the user's ears, such that the mask is supported on the user's face by the ear strap, and wherein in the second configuration, the head strap is removably attached to both ear straps via the connector support elements, such that the mask is supported on the user's face by the head strap. A fifth embodiment can include the mask of the first to fourth embodiments, wherein the half-mask may be a (powered/smart/disposable) dust-mask. A sixth embodiment can include the mask of the first to fifth embodiments, wherein the dust-mask may have a PM 2.5 fine particle designation. A seventh embodiment can include the mask of the first to sixth embodiments, wherein each connector support element comprises a removable connector (and an ear base portion). An eighth embodiment can include the mask of the first to seventh embodiments, wherein each connector support element's ear base portion may be curved. A ninth embodiment can include the mask of the first to eighth embodiments, wherein the connector support element may comprise a soft material and a rigid material. A tenth embodiment can include the mask of the first to ninth embodiments, wherein the softer material interfaces with the user's head and/or ear and is comprised of a thermoplastic urethane (TPU) cushion. An eleventh embodiment can include the mask of the first to tenth embodiments, wherein the portion of the connector support element on the corresponding ear strap may be fixed in place. A twelfth embodiment can include the mask of the first to eleventh embodiments, wherein the portion of the connector support element with regards to the corresponding ear strap is not fixed, allowing for positioning/adjustment of the mask (e.g. based on user comfort or ear profile) (allowing the connector support element to lay approximately behind the user's ear). A thirteenth embodiment can include the mask of the first to twelfth embodiments, wherein the ear strap on each corresponding side of the mask may comprise two elastic elements, wherein a free end of the top, left strap is securely/permanently attached to the top free end of the left connector support element and the free end of the bottom, left strap is securely/permanently attached to the bottom free end of the left connector support element, and wherein a free end of the top, right strap is securely/permanently attached to the top free end of the right connector support element and the free end of the bottom, right strap is securely/permanently attached to the bottom free end of the right connector support element. A fourteenth embodiment can include the mask of the first to thirteenth embodiments, wherein the ear strap on each corresponding side of the mask comprises one elastic element, wherein the elastic element on the left side of the mask runs through the left connector support element, and wherein the elastic element on the right side of the mask runs through the right connector support element (to provide a snug fit between the connector support element and the elastic element of the ear strap) (each ear strap forms a loop from top to bottom of the mask and each connector support element is attached to the corresponding ear strap). A fifteenth embodiment can include the mask of the first to fourteenth embodiments, wherein the free ends of the right ear strap are welded/securely attached/permanently affixed to the right side of the mask, and wherein the free ends of the left ear strap are welded/securely attached/permanently affixed to the left side of the mask. A sixteenth embodiment can include the mask of the first to fifteenth embodiments, wherein the free ends of the right ear strap are removably attached to the right side of the mask, and wherein the free ends of the left ear strap are removably attached to the left side of the mask. A seventeenth embodiment can include the mask of the first to sixteenth embodiments, wherein the removable connector comprises a receiving element, and wherein the receiving element comprises an aperture. An eighteenth embodiment can include the mask of the first to seventeenth embodiments, wherein the receiving element is configured to interact with a projection on the head strap, and wherein the projection fits snugly within the aperture of the receiving element for removable locking (e.g. interference) fit (e.g. a snap lock). A nineteenth embodiment can include the mask of the first to eighteenth embodiments, wherein the removable connector projects outward from the ear base portion (away from the ear contacting side of the ear base portion), wherein the opening of the aperture is located at the distal end of the projection, wherein at least one side of the projection has a second aperture for interaction with a biased locking element ((of the projection) of the head strap), so that upon insertion the biased locking element extends through the second aperture to lock into position, and wherein unlocking the biased locking element from the removable connector requires depression of the biased locking element to create a clearance for removal. A twentieth embodiment can include the mask of the first to nineteenth embodiments, wherein the removable connector comprising the biased locking element projects outward from the ear base portion (away from the ear contacting side of the ear base portion), wherein the biased locking element is configured for interaction with a projection comprising an aperture, wherein at least one side of the projection has a second aperture, so that upon insertion the biased locking element extends through the second aperture to lock into position, and wherein unlocking the biased locking element from the projection requires depression of the biased locking element to create a clearance for removal. A twenty-first embodiment can include the mask of the first to twentieth embodiments, wherein the length of the inner part of the ear base portion of the connector support element is long enough to comfortably interact with an average user's ear. A twenty-second embodiment can include the mask of the first to twenty-first embodiments, wherein the receiving element comprises a magnet and the projection comprises a magnetic material. A twenty-third embodiment can include the mask of the first to twenty-second embodiments, wherein the receiving element comprises a magnetic material and the projection comprises a magnet (and wherein the magnet is strong enough to provide secure (but removable) attachment of the head strap to the connector support element). A twenty-fourth embodiment can include the mask of the first to twenty-third embodiments, wherein the removable connector comprises a buckle/projection configured to interact with the head strap to allow removable connection of the head strap to the ear strap. A twenty-fifth embodiment can include the mask of the first to twenty-fourth embodiments, wherein the head strap comprises a projection located on each free end of the head strap, and wherein the projection interacts with the aperture of the removable connector to allow for removable connection of the head strap to the ear strap. A twenty-sixth embodiment can include the mask of the first to twenty-fifth embodiments, wherein the head strap is configured to allow adjustment of the length of the head strap (to allow the user to adjust/manipulate the fit of the mask).

Exemplary embodiments might also relate to methods for configuring the straps in such mask embodiments (e.g. similar to those described above, which may be considered optionally incorporated herein with respect to the discussion of the methods). Such method embodiments, for example, might include, but are not limited to, the following:

In a twenty-seventh embodiment, a method for configuring a mask having an ear strap loop attached (via the free ends) on each side of the mask and wherein each ear strap comprises a connector support element to allow removable attachment of a head strap, comprising the following step: removably attaching each free end of the head strap to the corresponding connector support element for the ear strap on each side of the mask. A twenty-eighth embodiment can include the method of the twenty-seventh embodiment, further comprising detaching each end of the head strap from each corresponding connector support element on the ear strap on each side of the mask. A twenty-ninth embodiment can include the method of the twenty-seventh to twenty-eighth embodiments, further comprising detaching the free ends of each ear strap from the face mask. A thirtieth embodiment can include the method of the twenty-seventh to twenty-ninth embodiments, further comprising adjusting, with regards to the corresponding ear strap, the location of the connector support element on the ear strap (to orient the connect support element behind the user's ear). A thirty-first embodiment can include the method of the twenty-seventh to thirtieth embodiments, further comprising adjusting the length of the head strap. A thirty-second embodiment can include the method of the twenty-seventh to thirty-first embodiments, further comprising adjusting the length of the ear straps. A thirty-third embodiment can include the method of the twenty-seventh to thirty-second embodiments, further comprising re-attaching the free ends of each ear strap to the corresponding side of the mask (at removable attachment points).

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A face mask to be worn over a user's face, the face mask comprising:

two ear straps, each configured to be worn around a corresponding ear of the user, each ear strap comprising a connector support element, wherein each of the connector support elements comprises an ear base portion comprising a top end, a bottom end, a hollow cavity having a longitudinal length extending from the top end to the bottom end and a locking element protruding perpendicularly outward from a surface of the ear base portion, the hollow cavity configured to allow each ear strap to extend through the hollow cavity, wherein each of the ear base portions of the connector support elements is movable along a fixed length of each ear strap for adjusting a location of each of the connector support elements along the fixed length of each ear strap, wherein the face mask comprises a head strap, and the connector support elements are configured for removable attachment of the head strap, thereby allowing the face mask to be worn in two configurations, wherein:

in a first configuration, the face mask is configured to be supported on the user's face by the ear straps that are worn around the user's ears, and in a second configuration, the head strap is removably attached to the ear straps via the connector support elements, such that the face mask is configured to be supported on the user's face by the head strap, and wherein the head strap comprises a receiving element at each free end and is removably attachable to the ear straps via insertion of each locking element into an aperture of the respective receiving elements at each free end of the head strap, wherein each receiving element is a snap joint, and wherein a direction of the insertion is transverse to the longitudinal length of the hollow cavity, posteriorly towards a rear of the user's head when the head strap is worn.

2. The face mask of claim 1, wherein each of the connector support elements is curved and comprises a soft material.

3. The face mask of claim 2, wherein the soft material is configured to interface with the user's head and is comprised of a thermoplastic urethane (TPU) cushion.

4. The face mask of claim 1, wherein the ear straps are on a corresponding side of the face mask and comprise two elastic elements.

5. The face mask of claim 1, wherein each of the receiving elements is attached to the respective free end of the head strap using a loop.

6. The face mask of claim 1, wherein each locking element includes a biased locking element, wherein removal of the head strap from each ear strap includes a depression of the biased locking element.

7. The face mask of claim 1, wherein a length of the head strap is adjustable to modify a tension of the two ear straps.

8. A method of wearing a face mask having a head strap and ear straps attached via free ends on each side of the face mask, each ear strap comprising a connector support element to allow removable attachment of the head strap, the method comprising the following steps:

in a first configuration, supporting the face mask on a user's face by the ear straps such that the ear straps are worn around the user's ears, wherein each connector support element comprises an ear base portion comprising a top end, a bottom end, a hollow cavity having a longitudinal length extending from the top end to the bottom end and a thickness, and a locking element protruding perpendicularly outward from a surface of the ear base portion, the hollow cavity configured to allow each ear strap to extend through the hollow cavity, and in a second configuration, removably attaching the head strap to each ear strap via the connector support elements, such that the face mask is supported by the head strap, wherein the head strap comprises a receiving element at each free end and is removably attachable to the ear straps via insertion of each locking element of the ear strap into an aperture of the respective receiving elements at each free end of the head strap, wherein each receiving element is a snap joint, and wherein each of the ear base portions of the connector support elements is movable along a fixed length of each ear strap for adjusting a location of each of the connector support elements along the fixed length of each ear strap, and wherein a direction of the insertion is transverse to the longitudinal length of the hollow cavity, posteriorly towards a rear of the user's head when the head strap is worn.

9. The method of claim 8, further comprising detaching the free ends of each ear strap from the face mask.

10. The method of claim 8, wherein each locking element includes a biased locking element, wherein removal of the head strap from each ear strap includes a depression of the biased locking element.

* * * * *